(No Model.) 2 Sheets—Sheet 1.

V. BEAUREGARD.
SAWING MACHINE.

No. 462,073. Patented Oct. 27, 1891.

WITNESSES:
William Claus
Paul P. Callahan

INVENTOR:
Victor Beauregard
by Chas. V. Gooding
his Atty.

(No Model.) 2 Sheets—Sheet 2.

V. BEAUREGARD.
SAWING MACHINE.

No. 462,073. Patented Oct. 27, 1891.

WITNESSES:
Geo. H. Cushman
Daniel T. McLeod

INVENTOR:
Victor Beauregard
by Chas. S. Goodwin
his atty.

UNITED STATES PATENT OFFICE.

VICTOR BEAUREGARD, OF BOSTON, MASSACHUSETTS, ASSIGNOR TO THE BRYANT SAWING MACHINE COMPANY, OF MAINE.

SAWING-MACHINE.

SPECIFICATION forming part of Letters Patent No. 462,073, dated October 27, 1891.

Application filed November 13, 1890. Serial No. 371,268. (No model.)

*To all whom it may concern:*

Be it known that I, VICTOR BEAUREGARD, a citizen of the United States, residing at Boston, in the county of Suffolk and Commonwealth of Massachusetts, have invented a new and useful Improvement in Sawing-Machines, of which the following is a specification.

The object of this invention is to drive a circular saw by means acting directly on its teeth.

To this end the invention in substance consists in the combination, with a gear-wheel, of a circular saw having the front or forward and rear or backward edges of and the open spaces between its teeth all relatively shaped for the teeth of said gear-wheel, properly located therefor, to enter into said open spaces and therein to mesh and work on the rear edges of the teeth, and thus from its rotation to continuously rotate the saw and for the front edges of the saw-teeth to saw the material suitably presented thereto, and all without contact between the teeth of said gear-wheel and said front edges of the teeth of the saw.

Figures 1, 2:
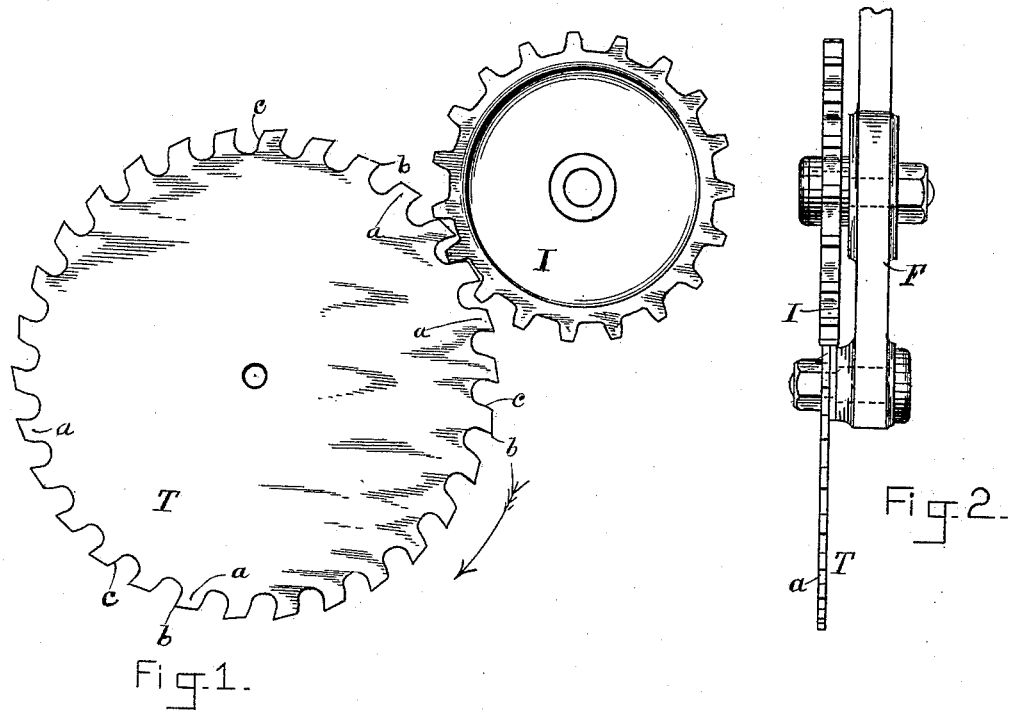
Figure 3:
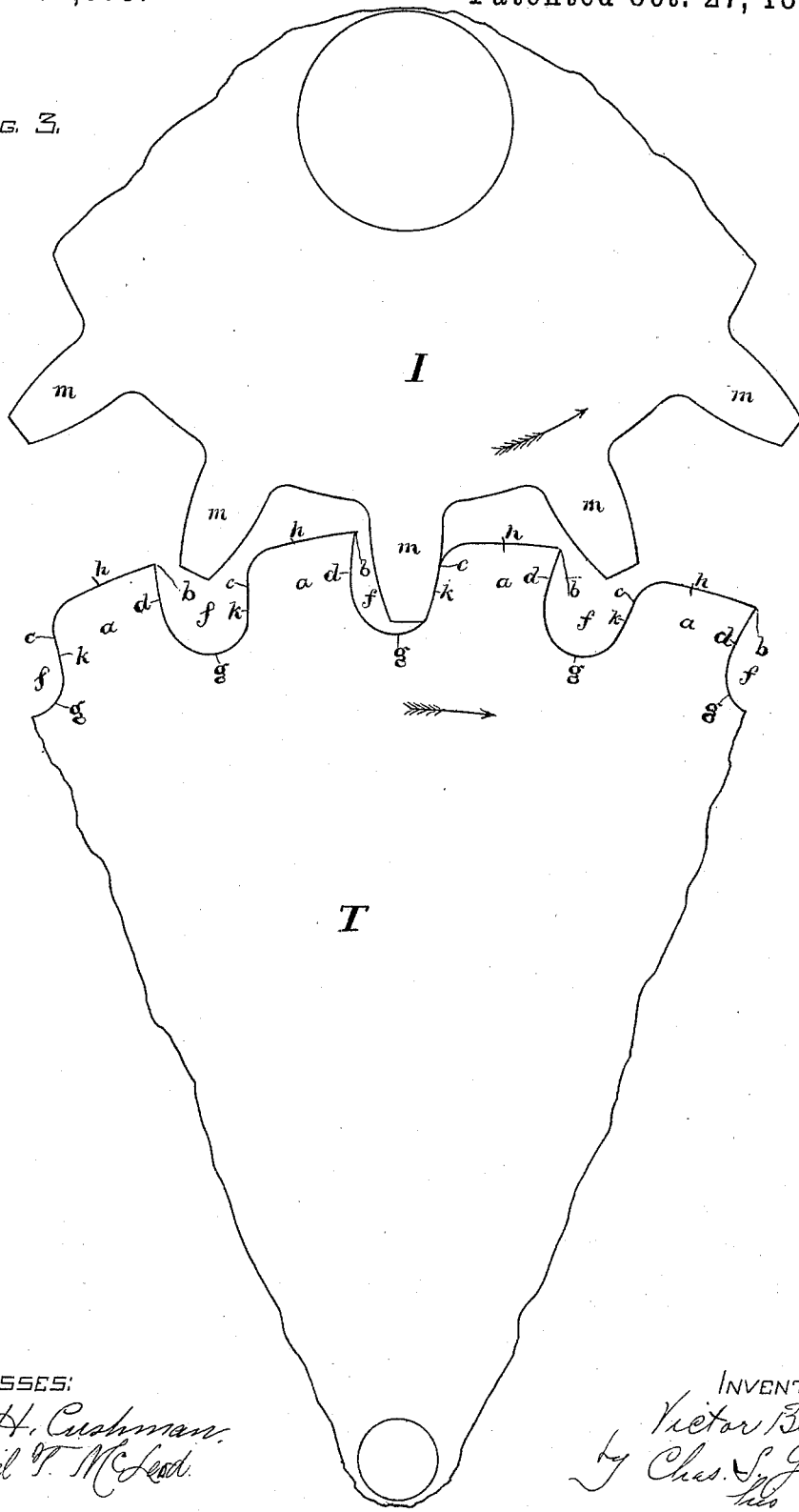

In the drawings forming part of this specification, Figure 1 is a front elevation of a circular saw of this invention and of a gear-wheel suitably located and having its teeth in mesh with the teeth of the saw. Fig. 2 is a side elevation, Fig. 1. Fig. 3 is a side elevation of the saw and gear-wheel, each only in part and both enlarged.

In the drawings, $a\ a$ are the teeth of a circular saw-blade T. These teeth encircle the saw, and, except as to this invention, they and the saw are all as usual. The several teeth of the saw have a front edge $d$, assuming the saw to be in rotation, as usual, and in the direction of the arrows, and the outermost point $b$ of this edge is adapted to serve as the sawing or cutting portion of the tooth, and the teeth also have a rear edge $c$.

$f\ f$ are open spaces or notches between the saw-teeth. Each open space $f$ is bounded by the front edge $d$ of one tooth and the rear edge $c$ of the tooth next directly in advance of the tooth having said front edge, and by a bottom edge $g$, joining said front and rear edges. The rear edge $c$ of each tooth is formed preferably as shown—that is, with a convex curve that is tangential to the circular periphery $h$ of the tooth of which it is the rear edge, and with a greater or less curve $k$, preferably one approximating a straight line in continuation of said convex curve and meeting tangentially a more or less semicircular formed innermost or bottom edge $g$ of the space $f$, and by which said rear edge $c$ of the one tooth is joined to the front edge $d$ of the other and the tooth next following. The front edges $d$ of the several teeth are formed preferably as shown—that is, for their outermost points $b$, as before stated, to be capable of sawing or cutting and from said points $b$ with a more or less concaving curve meeting tangentially the semicircular innermost edge $g$ of the space $f$ between the tooth to which said front edge belongs and the back edge of the tooth next in advance thereof.

I is a vertical gear-wheel, having teeth $m$ and all otherwise as well known. This gear-wheel, as shown, Fig. 3, is arranged above, and Fig. 1 at one side of the saw and in a vertical plane coincident with the vertical plane of the saw and otherwise for its teeth to enter into the open spaces $f$ between and to mesh with and to bear against and work on the rear edge $k$ of the teeth of the saw, and thus with the gear-wheel being suitably driven to drive and rotate the circular saw in the direction stated. The rear and front edges $k\ d$ of the teeth and the spaces $f$ between said edges, all and severally shaped substantially as described, allow of the mesh of the teeth of the gear-wheel with the teeth of the saw in a manner insuring proper contact of the gear-teeth with the rear edges $k$ of the saw-teeth, so as to drive the saw and to pass from said rear edges and out of the open spaces $f$ between the teeth, so as to have no contact between them and the front edges $d$ of the saw-teeth.

For the practical working of the circular saw T and gear-wheel, I arrange together, as described obviously, a suitable support for both is to be provided—as, for illustration, Fig. 2, a frame F, on which they are both held and adapted to rotate the saw from the rotation of the gear-wheel, and the gear-wheel from the power suitably applied to it. It is preferable, and so shown, that the teeth of the gear-wheel shall not have contact with the periphery $h$ of the saw-teeth, and that the depth of the spaces $f$ between the saw-teeth shall be sufficient to permit the gear-wheel, it having been properly adjusted therefor, to mesh and work on the backward edges $k$ of the saw-teeth, as described, so that if the saw wears away or is ground off upon its periphery $h$, the gear I may be adjusted nearer to the center of the saw and still leave clearance between the crown or outermost portion of the teeth $m$ of the gear and the root or bottom edge $g$ of the spaces $f$.

Among many advantages secured by an adaptation of the teeth of a circular saw for the application of a gear-wheel to its teeth and thereby to drive the saw, all as has been described, may be mentioned the following: first, that the full power of the driving gear-wheel is transmitted to the saw as it operates the saw at its most efficient portion; second, that the attaching of the saw to its shaft is not necessarily required to be as rigid as when the saw is driven by its shaft; third, that the saw is subjected to less strain and has less tendency to spring or break; fourth, that the material to be sawed can be placed more closely to the axis or center of the saw than it can be when the saw is driven by its shaft, as heretofore, thus enabling saws of much smaller diameter to be used than otherwise would be possible.

Having thus described my invention, what I desire to secure by Letters Patent is—

In a sawing-machine, the combination, with a circular saw having teeth with front and rear edges $d$ $c$ and spaces $f$ between them, all essentially as described, of a gear-wheel suitably adapted and located to mesh and work on the rear edges of said saw-teeth, and thereby to drive said saw, substantially as described, and for the purposes specified.

VICTOR BEAUREGARD.

Witnesses:
   CHAS. S. GOODING,
   WILLIAM CLAUS.